United States Patent
Phillips et al.

(10) Patent No.: US 10,020,125 B1
(45) Date of Patent: Jul. 10, 2018

(54) SUPER DIELECTRIC CAPACITOR

(71) Applicant: The United States of America, as represented by the Secretary of the Navy, Washington, DC (US)

(72) Inventors: Jonathan Phillips, Pacific Grove, CA (US); Samuel Salvadore Fromille, IV, Kapolei, HI (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 83 days.

(21) Appl. No.: 15/239,039

(22) Filed: Aug. 17, 2016

Related U.S. Application Data

(63) Continuation-in-part of application No. 14/624,321, filed on Feb. 17, 2015, now Pat. No. 9,530,574.

(51) Int. Cl.
*H01G 11/56* (2013.01)
*H01G 11/22* (2013.01)
*H01G 11/62* (2013.01)
*H01G 11/86* (2013.01)
*H02J 7/00* (2006.01)
*H02J 7/34* (2006.01)

(52) U.S. Cl.
CPC ............ *H01G 11/56* (2013.01); *H01G 11/22* (2013.01); *H01G 11/62* (2013.01); *H01G 11/86* (2013.01); *H02J 7/0063* (2013.01); *H02J 7/345* (2013.01); *H02J 2007/0067* (2013.01)

(58) Field of Classification Search
CPC ........ H01G 11/56; H01G 11/22; H01G 11/62; H01G 11/86; H02J 7/0063; H02J 7/345; H02J 2007/0067

USPC ......................................................... 361/502
See application file for complete search history.

(56) References Cited

U.S. PATENT DOCUMENTS

| 3,138,746 | A | 6/1964 | Burger et al. |
| 3,547,423 | A | 12/1970 | Jenny et al. |
| 3,700,975 | A | 10/1972 | Butherus et al. |
| 6,454,816 | B1 | 6/2002 | Lee et al. |
| 2011/0304953 | A1 | 12/2011 | Zhou et al. |
| 2013/0335885 | A1* | 12/2013 | Ginatulin ............... H01G 11/36 361/511 |

(Continued)

OTHER PUBLICATIONS

Wakai,"How Polar Are Ionic Liquids? Determination of the Static Dielectric Constant of an Imidazolium-based Ionic Liquid by Microwave Dielectric Spectroscopy," J. Phys. Chem. B, vol. 109, No. 36 (2005).

(Continued)

*Primary Examiner* — Michael P McFadden
(74) *Attorney, Agent, or Firm* — Naval Postgraduate School; James B. Potts; Lisa A. Norris

(57) ABSTRACT

A class of materials is provided that has dielectric constants greater than $10^5$. The super dielectric materials (SDM) can be generated readily from common, inexpensive materials. Various embodiments include a porous, electrically insulating material, such as high surface area powders of silica or titania, mixed with a liquid containing a high concentration of ionic species. In some embodiments, high surface area alumina powders, loaded to the incipient wetness point with a solution of boric acid dissolved in water, have dielectric constants greater than $4 \times 10^8$.

19 Claims, 17 Drawing Sheets

(56) References Cited

U.S. PATENT DOCUMENTS

2015/0072267 A1\* 3/2015 Suss ....................... H01M 8/18
429/499

OTHER PUBLICATIONS

Sato et al., "Electrochemical properties of novel ionic liquids for electric double layer capacitor applications," Electrochimica Acta 49 (2004).
Zhao et al., "Capacitance at the Electrode/Ionic Liquid Interface," Acta Phys. Chim. Sin., vol. 26 (2010).

\* cited by examiner

US 10,020,125 B1

SUPER DIELECTRIC CAPACITOR

RELATION TO OTHER APPLICATIONS

This application claims priority to and the benefit of U.S. application Ser. No. 14/624,321 filed Feb. 17, 2015, which is hereby incorporated in its entirety by reference.

FIELD OF THE INVENTION

The present invention is directed to dielectric materials. In particular the present invention is directed dielectric materials having high dielectric constants.

BACKGROUND

There are several distinct capacitor technologies, such as super capacitors and traditional electrostatic, also known as 'dielectric', capacitors. Super capacitors increase capacitance by increasing the surface area of the electrically conductive electrode. Most of the volume of a super capacitor is the high surface area electrode, which is basically in powder form. Increasing the super capacitor 'depth' while keeping constant the shape/surface area of the attaching ends, increases the amount of electrode material area and increases the capacitance. Consistent with this paradigm is the recent interest in employing graphene in super capacitors, as graphene is very good for that purpose. Indeed, graphene has very high electrical conductivity and the measured surface of some graphene forms are near the theoretical limit (2700 $m^2$/gm). Given that the electrode surface area of graphene in super capacitors is near its theoretical limit, further dramatic energy density increases in these devices is unlikely.

In contrast to the improvements made with super capacitors, there has only been a marginal advance in the last few decades in finding materials with superior dielectric constants for the traditional electrostatic capacitor that is a capacitor built of a single dielectric material with a high dielectric constant sandwiched between two flat conductive electrodes. One clear functional contrast between super capacitors and electrostatic capacitors is the impact of 'depth' or 'thickness'. In an electrostatic capacitor, capacitance increases inversely to the distance between plates. Thus, given plates of a constant size, the thinner an electrostatic capacitor, the greater the capacitance. Therefore in order to improve the performance of this style of capacitor they either have to be made thinner and/or use materials with higher and higher dielectric constants.

SUMMARY

In accordance with one embodiment of the invention a capacitor comprising a dielectric material having a dielectric constant greater than $10^5$ includes: a porous material having a surface area greater than 0.5 $m^2$ of surface/gm of material; and a liquid containing ions, where the liquid and ions are within the pores of the porous material.

In accordance with another embodiment of the invention a capacitor includes: a first electrode including a conductive material; a dielectric material located on the first electrode, wherein the dielectric material has a dielectric constant greater than $10^5$ and includes; a porous material having a surface area greater than 1 $m^2$ of surface/gm of material; and a liquid containing ions, wherein the porous material is mixed with the liquid; and a second electrode located on the dielectric material, wherein the second electrode is made of a conductive material.

In accordance with a further embodiment of the invention a method for forming a dielectric material with a dielectric constant greater than $10^5$ includes: forming a paste by mixing a porous material having a surface area greater than 0.5 $m^2$ of surface/gm of material, with a liquid containing ions.

DETAILED DESCRIPTION

For illustrative purposes, the principles of the present disclosure are described by referencing various exemplary embodiments. Although certain embodiments are specifically described herein, one of ordinary skill in the art will readily recognize that the same principles are applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in different order as may be appreciated by one skilled in the art; the method embodiments described are therefore not limited to the particular arrangement of steps disclosed herein.

It is noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

Provided here is a capacitor comprising a dielectric of a porous, non-electrically conductive, skeletal frame saturated with a liquid containing dissolved ions. Upon the application of an electric field ions dissolved in the saturating liquid contained in the pores will travel toward the ends of pore filling liquid droplets creating giant dipoles. The fields of these giant dipoles oppose the applied field, reducing the net field created per unit of charge on the capacitor plates, effectively increasing charge/voltage ratio, hence capacitance. The maximum voltage such materials can sustain is generally limited by the breakdown voltage of the liquid phase. The dielectric is thus a multi-material mixture comprising both liquid and solid, where the solid serves as a physical framework or skeleton holding the polarizable elements in place, and mobile ions in a liquid solution provide the polarizable element.

Figure 1:
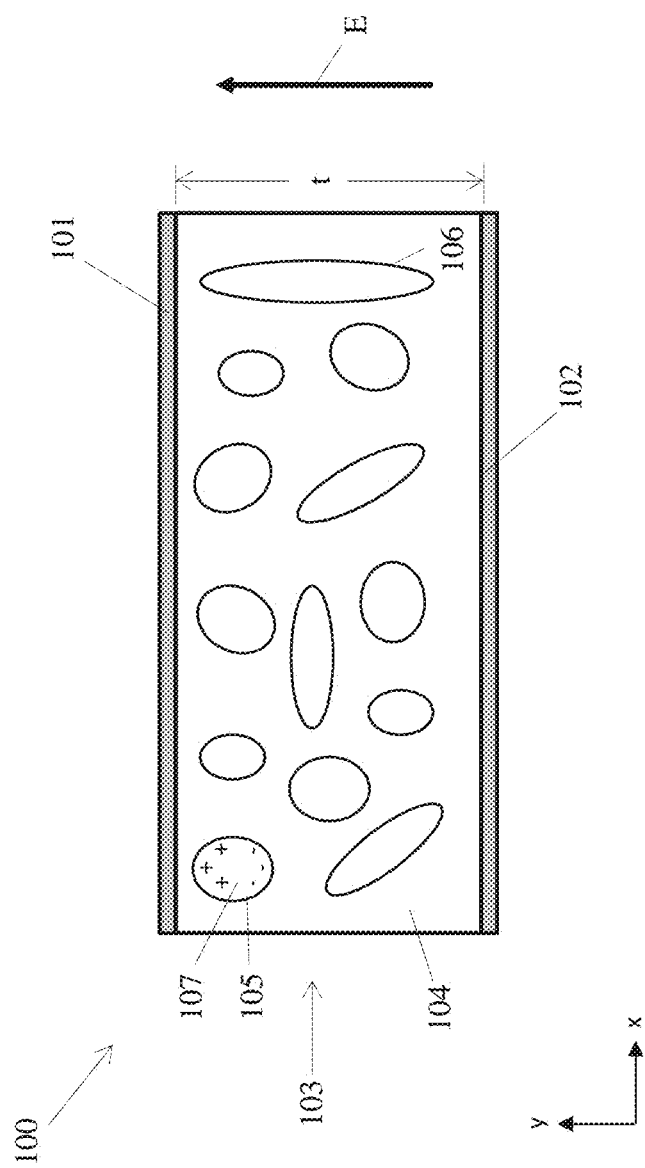
FIG. 1 shows an embodiment of the capacitor and dielectric disclosed.

A particular embodiment of a capacitor 100 is generally illustrated at FIG. 1. Capacitor 100 comprises a first electrode 101 and a second electrode 102 generally comprised of a conductive material. A dielectric material generally indicated by 103 separates first electrode 101 and second electrode 102, with dielectric material 103 comprised of a porous material 104, and pores such as a 105 and 106 comprising porous material 104. Dielectric material 103 further comprises a liquid within the pores, such as liquid 107 within pore 105. Liquid 107 comprises ions, such as the cations + and anions − indicated within pore 105. Typically, porous material 104 contacts first electrode 101 and second electrode 102 and extends across a distance t separating first electrode 101 and second electrode 102.

At FIG. 1, ions such as + and − in the liquid within the pores of dielectric material 103 migrate to create dipoles in response to an applied electric field. For example, an electric field E generated from electrode 102 to electrode 101. Generally, the created dipoles have length dependent on a liquid-filled pore diameter. This phenomenology can be manipulated to create a high dielectric material. In each water drop dipoles oppose the applied field E resulting in a decrease in the net field. As more charges are added the dipoles grow larger, hence the net field grows slowly.

The dielectric material 103 of FIG. 1 differs significantly from typical dielectric materials. As is understood, typical dielectric materials generally increase the amount of electric charge stored on a capacitor by lowering the voltage associated with the number of charges. This results from the formation of dipoles in the dielectric that opposes the applied field, thus reducing the net field for any specific charge concentration on the electrode. As capacitance is charge/voltage, the lowering of the voltage for any given number of charges increases capacitance. Typically these dipoles are generally a fraction of an angstrom (Å) in length, meaning longer dipoles would reduce the net field to an even greater extent. In contrast, the dielectric material 103 of capacitor 100 having, for example, pores on the order of 500 Å and filled with liquid 105 comprising cations and anions will have much larger dipoles than found in any solid, and hence will have better dielectrics than any solid or any pure liquid for which the dipole length is no greater than the length of the molecules that compose the liquid.

For capacitor 100, first electrode 101 and second electrode 102 may be any conducting material. In a particular embodiment, first electrode 101 and second electrode 102 comprise a conductive material having conductivity greater than $10^3$ S/cm. In certain embodiments, the distance t separating first electrode 101 and second electrode 102 is at least 0.5 µm. In other embodiments, first electrode 101 comprises a first conductive material having conductivity greater than $10^3$ S/cm and the first conductive material comprises at least 50 weight percent (wt. %), at least 70 wt. %, or at least 90 wt. % of first electrode 101, and in further embodiments, second electrode 102 comprises a second conductive material having a conductivity greater than $10^3$ S/cm and the second conductive material comprises at least 5 wt. %, at least 50 wt. %, at least 70 wt. %, or at least 90 wt. % of second electrode 102. As used here, "conductive material" may describe a material of singular composition or a combination of materials having different compositions. In further embodiments, first electrode 101 and second electrode 102 have a conductivity greater than $10^3$ S/cm.

As discussed, porous material 104 is a material comprising pores and may be any material having a porous structure where ion-containing liquid may reside within a pore volume. In an embodiment, porous material 104 comprises an insulating material having a conductivity less than $10^{-8}$ S/cm. In other embodiments, the insulating material comprises at least 5 wt. %, at least 50 wt. %, at least 70 wt. %, or at least 90 wt. % of porous material 104. As used here, "insulating material" may describe a material of singular composition or a combination of materials having different compositions. In further embodiments, porous material 104 has a conductivity less than $10^{-8}$ S/cm.

Porous material 104 may substantially be an agglomerate comprising consolidated material existing as a relatively rigid, macroscopic body whose dimensions exceed those of the pores by many orders of magnitude. Alternatively, porous material 104 may be an aggregate comprising unconsolidated, nonrigid, loosely packed assemblages of individual particles. Additionally, when such particles are present, the particles themselves may be nonporous and surrounded by a network of interparticle voids, or the particles themselves may be significantly porous and porous material 104 may comprise both internal voids and interparticle voids. Additionally, porous material 104 may comprise a wide distribution of pore sizes, and include micropores (diameter <2 nm), mesopores (2 nm<diameter <50 nm), macropores (diameter >50 nm), and combinations thereof. See Aleman et al., "Definitions of Terms Relating to the Structure and Processing of Sols, Gels, Networks, and Inorganic-Organic Hybrid Materials (IUPAC Recommendations 2007)," *Pure Appl. Chem.* 79(10) (2001).

In certain embodiments, porous material 104 has a specific surface area greater than 0.5 m$^2$ of surface/gram. In other embodiments when porous material 104 is an aggregate as discussed above, individual particles comprising the aggregate have a specific surface area greater than 0.5 m$^2$ of surface/gram. In other embodiments, the pores of porous material 104 have a radius between 1-10,000 Å, and in other embodiments have a mean pore diameter between 1-20,000 Å, and in other embodiments have a mean pore diameter between 1-200,000 Å. In certain embodiments when individual particles comprise an aggregate, the individual particles have a mean pore diameter between 1-200,000 Å. Mean pore diameter may be determined using means known in the art, such as bubble point methods, mercury porosimetry, thermoporometry, permporometry, adsorption/desorption methods, as well as microscopic methods such as scanning electron microscopy, transmission electron microscopy, and others. See e.g., Stanley-Wood et al., *Particle Size Analysis* (1992), among others. In some embodiments, the mean pore diameter is less than 50% of the distance t separating first electrode 101 and second electrode 102, and in another embodiment, less than 10%, and in a further embodiment, less than 1%. In another embodiment, porous material 104 is a media having a porosity of at least 50%. In some embodiments, porous material 104 comprises an oxide such as alumina, silica, titania, magnesia, and other metal oxides. However, porous material 104 may comprise any material having characteristics as disclosed herein, including fabrics, fibers, sponges, polymer materials such as nylon, and others.

The liquid 107 within the pores of porous material 104 may be any liquid comprising ions. In certain embodiments, liquid 107 has an ionic strength of at least 0.1 where the ionic strength is a function of the concentration of all cations and anions present in liquid 107. In some embodiments, the ions comprising liquid 107 comprise cations and anions and the cations have an ionic concentration of at least 0.1 moles per liter of liquid and the anions have an ionic concentration of at least 0.1 moles per liter of liquid. See IUPAC, *Compendium of Chemical Terminology* (the "Gold Book") ($2^{nd}$, 1997). In other embodiments, liquid 107 comprises a solvent and a solute and the solute has a molarity of at least 0.1 moles solute per liter of solvent. In another embodiment, the solute is a polar liquid having a dielectric constant of at least 5, preferably at least 15, and in a further embodiment the solute is a salt, acid, base, or mixtures thereof. Here, "salt" includes nitrates, nitrides, carbides, alkali halides, metal halides and other crystal structures that dissolve in water to create dissolved ions. In certain embodiments, the solvent of liquid 107 is saturated with the solvent to at least a 1% saturation, and in other embodiments at least 10%. In another embodiment, the solvent is water and liquid 107 is an aqueous solution. Additionally, liquid 107 may comprise an organic solvent, containing an electrolyte selected from an acid, a base, and a neutral salt. Also, liquid 107 may be a liquid such as those found in acid or base solutions, salt solutions, other electrolytic solutions or ionic liquids of any kind. As disclosed herein, the liquid comprising ions may be any liquid or mixture of liquids, solvents, solutes and the like which provide ions in a liquid as described within this disclosure.

Liquid 107 may be located in the pores of porous material 104 using any means known in the art. In certain embodiments, porous material 104 and liquid 107 may be mixed by hand or otherwise to create a spreadable paste with little to substantially no free water (incipient wetness). "Paste" as used herein refers to a thick, soft moist substance, having little to substantially no free water. However, other methodologies may be employed as known in the art, including incipient wetness impregnation, direct immersion, capillary impregnation, diffusional impregnation, pressure or vacuum impregnation, and others.

DESCRIPTION OF SPECIFIC EMBODIMENTS

Example 1

In one embodiment of the present invention, a Super Dielectric Material (SDM) is created from a high surface area alumina bathed in a solution of boric acid. The high dielectric constants measured provides for having a material that can be used to develop an SDM capacitor as an alternative to super capacitors for electrical energy storage/power delivery. A method of making an SDM capacitor such as capacitor 101 is discussed with reference to FIG. 2.

The SDM was fabricated by an aluminum/boric acid paste. In order to form the paste of aluminum/boric acid, high surface area aluminum oxide powder (Alfa Aesar, γ-phase, 99.97%, 3 micron APS Powder, S.A. 80-120 $m^2$/g, CAS 1344-28-1), boric acid powder (BDH, 99.5% $H_3BO_3$, CAS 10043-35-3), and distilled deionized water, i.e., constituents were utilized. These constituents were mixed by hand to obtain this ratio in all cases: 1 gm alumina/1 ml $H_2O$/0.1 gms boric acid powder. The mixed constituents created a spreadable paste with little to substantially no free water (incipient wetness). This is represented at step 202 of FIG. 2. A mixture of 1 ml of water and 0.1 gms boric acid is only weakly acidic with a theoretical pH of approximately 4.5.

As pore structure is a significant component of the embodiment, the surface area and pore structure were determined from BET nitrogen isotherms collected at 77K and analyzed using a Quantachrome NOVA 4200e. Two samples were independently measured and both yielded results within 5% for all parameters. Specifically a surface area of 39+/−1 $m^2$/gm, a total pore volume of 0.45 $cm^3$/gm and an average pore radius of 245+/−3 Å.

Figure 2:
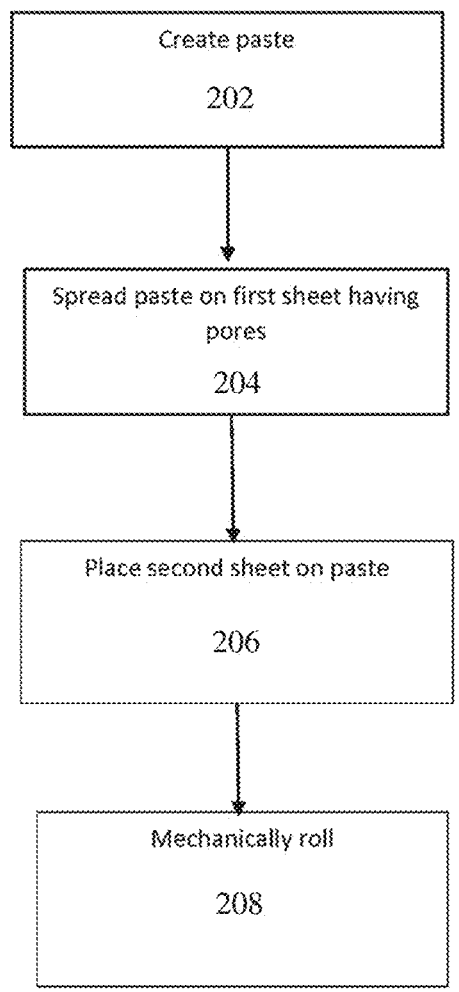
FIG. 2 shows a flow chart illustrating the method of forming a super dielectric material (SDM) and a SDM capacitor formed using SDM.

The paste was spread evenly on an electrode material in order to form a dielectric layer, indicated at step 204 of FIG. 2. In the embodiment described, the electrode material was a 2.5 cm diameter disc of GTA grade Grafoil (0.76 mm thick, >99.99% carbon). GTA grade Grafoil is a commercially available high purity carbon material that is available in sheets or rolls made by compressing naturally occurring graphite flakes. Another electrode material was placed on top the paste spread on the initial electrode layer as indicated at step 206 of FIG. 2, such that the SDM paste and electrodes where arranged analogous to first electrode 101, second electrode 102, and dielectric material 104. In this embodiment, both electrode materials were Grafoil. The resulting thin, SDM capacitor was mechanically rolled to create a near constant thickness as determined by measurements made at multiple positions using a hand held micrometer, as represented at step 208 of FIG. 2. The 'effective thickness' of thickness t of the dielectric used in all computations herein was based on subtracting the thickness of the first electrode, herein a first thickness $T_1$, and the thickness of the second electrode, herein a second thickness $T_2$, from the measured total thickness of the SDM capacitor herein total thickness $T_{TOT}$, where $T_1$, $T_2$, and $T_{TOT}$ are parallel to the y-axis of FIG. 1.

Once constructed one or more SDM capacitors were placed in a plastic jig with bottom and top cylindrical aluminum electrodes having 5 cm diameters and 5 mm thicknesses. A 250 gm weight was placed on top in all cases. SDM capacitors were then placed in simple circuits, such as that shown in FIG. 3 comprising voltage source $E_{DC}$, the SDM capacitor C, resistance R, and voltmeter V, in order to obtain measurements of charge and discharge. Charging and discharging were performed through a nominal 20 kOhm resistor.

The primary test platform was a National Instruments ELVIS II electronics prototyping board implemented with LabView 2011 software. An additional multimeter, Agilent U1252A, was used for independent parameter verification. Additionally the capacitance of several types of commercial capacitors were measured using the above described instruments and protocol, and in each case the measured value and the listed value were within 30%.

Figure 3:
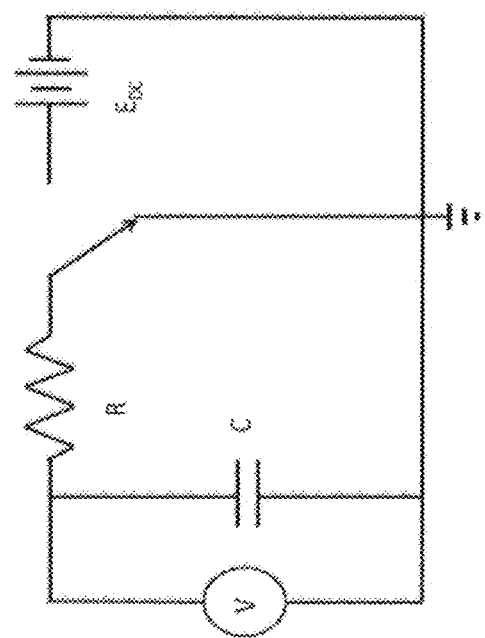
FIG. 3 is a diagram of the circuit used in testing an SDM capacitor.
Figure 4:
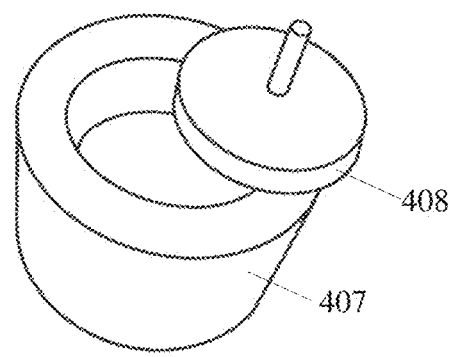
FIG. 4 shows an SDM capacitor placed in a hard plastic jig between two aluminum electrodes having 5 cm diameters.
Figure 5:
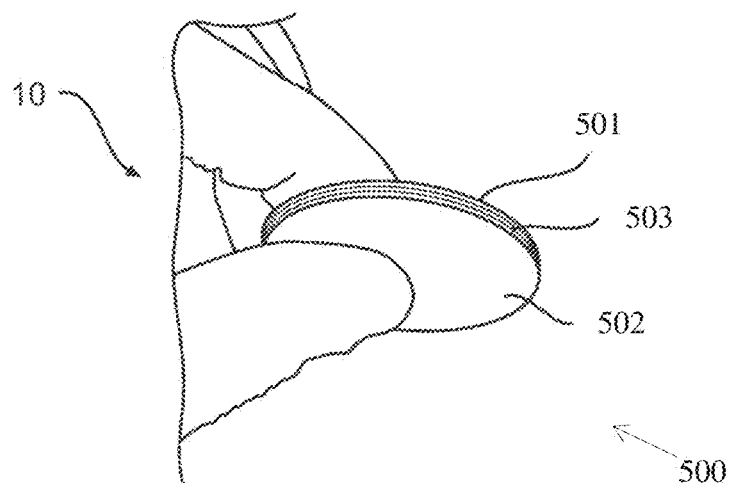
FIG. 5 shows a completed SDM capacitor

FIGS. 3, 4 and 5 illustrate measurement and fabrication aspects in accordance with one embodiment of an SDM capacitor. In one embodiment, the term A-SDM is used herein where A stands for alumina. In FIG. 3 with the switch 'down' the discharge voltage across the resistor is measured, and with the switch 'up' the charging is recorded. In FIG. 4 the capacitor is placed in a hard plastic jig 407 between two aluminum electrodes having a 5 cm diameter and weighted with weight 408. FIG. 5 shows a completed SDM capacitor 500 with a dielectric 503 comprising a paste of aluminum/water/boric acid squeezed between first electrode 501 and second electrode 502 made of Grafoil in accordance with an embodiment of the present invention.

Figure 6:
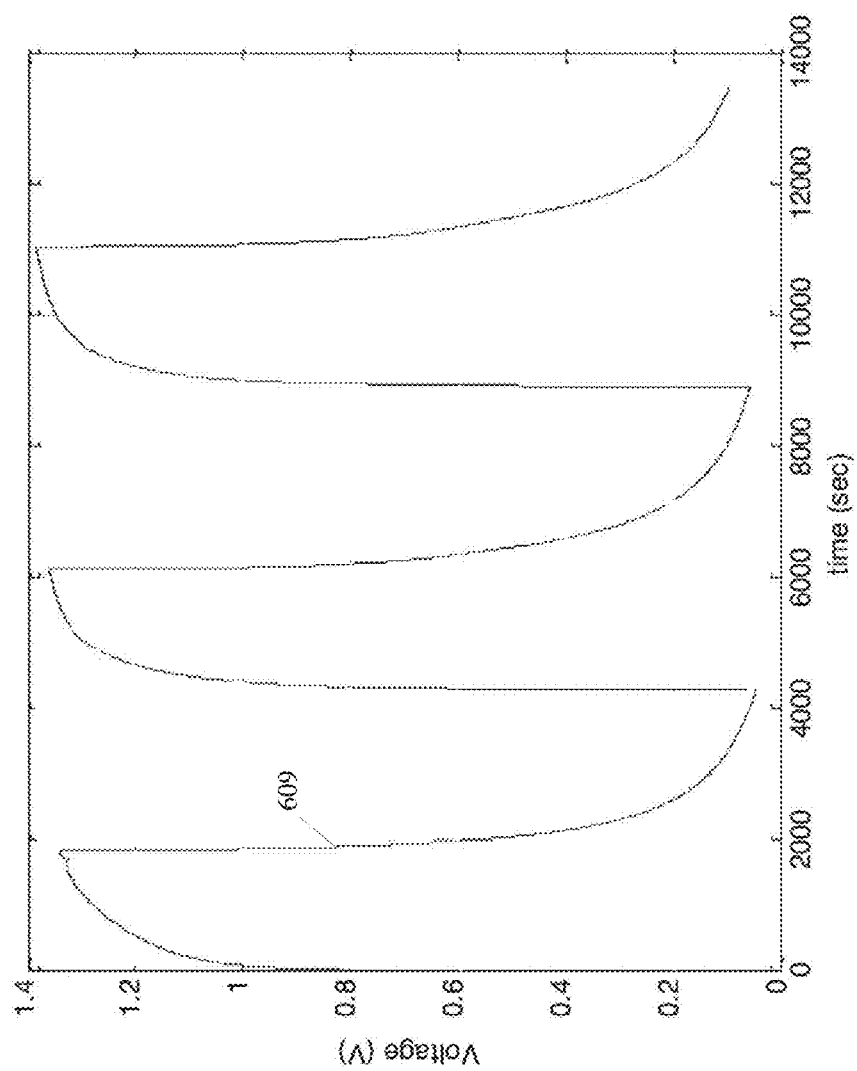
FIG. 6 shows capacitive cycling in accordance with an embodiment of the present invention.

Basic phenomenological data from studies of cyclic charging and discharging show that SDM capacitors made with A-SDM behave as near ideal capacitors over a limited, repeatable, voltage range. Typical multi-cycle data from one SDM capacitor 500, charged through a 20 kOhm resistor from a power supply operated at 4 V, then discharged through the same resistor, is shown in FIG. 6 as 609. Re-plotting similar data from several SDM capacitors 500 was done to test the proposition that these SDM capacitors charge/discharge exponentially, as per standard electrostatic capacitors. The equation for this is shown below:

$$\ln(V/V_0) = t/RC \qquad (1)$$

In equation (1) above, V is voltage, $V_o$ is initial voltage, t is time, R is resistance and C is capacitance. Moreover, the dielectric constant of A-SDM in SDM capacitor 10 can be obtained from the time constant and the standard equation:

$$C = \varepsilon_0 \varepsilon_R \frac{A}{d} \qquad (2)$$

In the above equation C, is capacitance, $\varepsilon_0$ is the permittivity of free space and $\varepsilon_R$ is the dielectric constant. The area of the plate surface is A and the distance between plates occupied by dielectric is d. From the plot shown in FIG. 7 it is clear that in all cases below about 0.8 V (more precise data given in Table 1) SDM capacitors such as 500 have constant time constants, hence constant capacitance. Using these measured time constants, the resistance value, and the physical parameters of SDM capacitors 500 the dielectric constants of A-SDM were computed, as shown in Table 1. The A-SDM dielectric material in SDM capacitors 500 is a form of super dielectric material, where in each case the measured dielectric constants were greater than $4 \times 10^8$.

FIG. 6 illustrates capacitive cycling in accordance with one embodiment. SDM capacitors such as 500 go through regular cycles, as shown. Note that the discharge time during the steady capacitive part of the cycles (<0.8 V) is more than 2000 seconds. There is some difference between charge and discharge cycles in terms of apparent capacitance.

Figure 7:
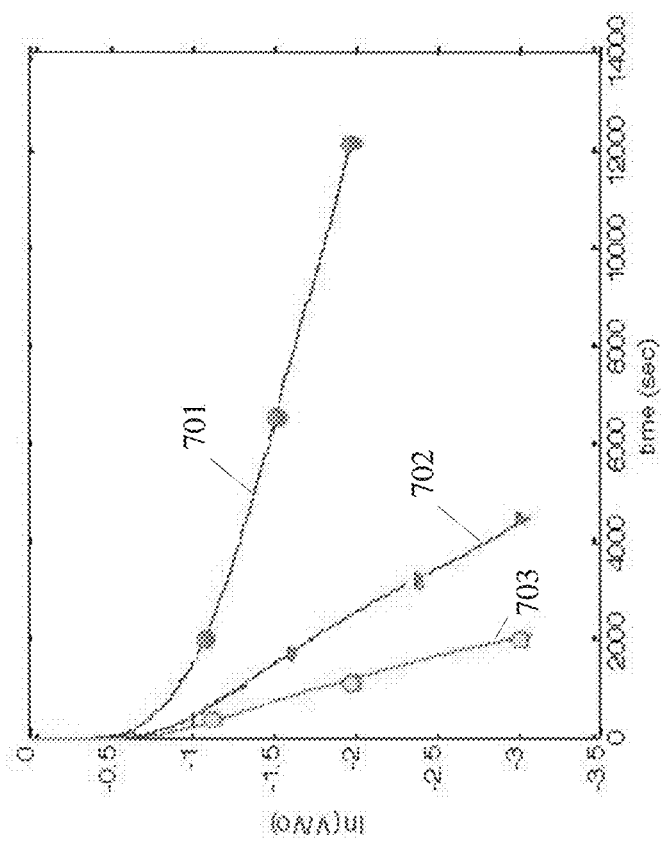
FIG. 7 is a graph showing discharge of electrolyte capacitors of varying thicknesses.

FIG. 7 illustrates dielectric constant in accordance with an A-SDM embodiment. From Equation 2 it is clear that the linear part of a plot of ln(V/V0) vs. time will yield the time constant, and using Equation 1 and measured surface area and depth, the dielectric constant can be obtained. As shown in Table 1, SDM capacitors 500 with three different thicknesses of the dielectric material were created and tested for discharge through a 528 kOhm resistor. At FIG. 6, trace 701 represents a capacitor with a thickness of 1.47 mm, trace 702 represents a capacitor with a thickness of 2.46 mm, and trace 703 represents a capacitor with a thickness of 4.13 mm. The plotted data, shown in FIG. 6, shows that the capacitance increased with decreasing thickness.

As can be seen from Table 2, the thinner the dielectric layer, the higher the capacitance. There is a variation in measured dielectric constant, but this probably does not reflect something fundamental, but rather the irregularity of handmade construction.

In addition to the above quantitative data, several qualitative observations were made regarding performance. First, the paste used to form dielectric layer 503 readily dries and transforms from a paste to an apparently totally dry, chalky solid. That is, it can be crushed using minimal force to form a fine powder. Simply leaving SDM capacitor 500 exposed to the laboratory environment for greater than 10 days leaves dielectric layer 503 in this form. In this form the capacitance is so low that charging and discharging take only one or two seconds. Second, it is clear that the addition of water to the dry dielectric from a dropper (added from above after lifting off the top Grafoil sheet), in an amount nearly equal in amount to that used initially, restores the paste consistency and the capacitance to within a factor of two of the value measured before drying. Third, if all parameters are the same, however no boric acid is present and only distilled deionized water is added to the alumina, then the capacitance is very low.

Figure 8:
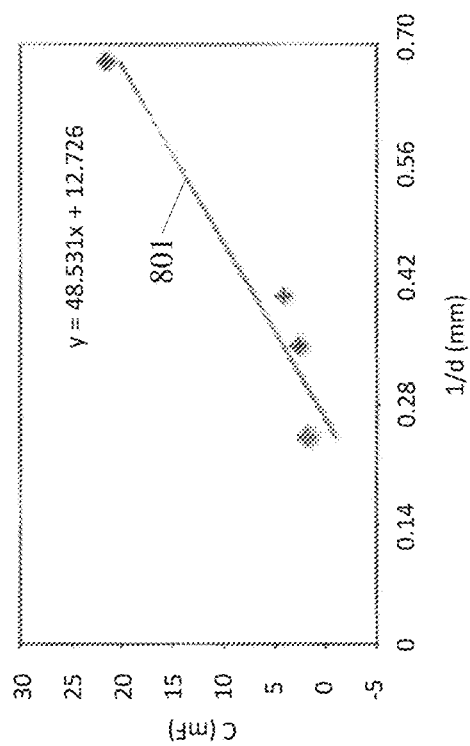
FIG. 8 is graph of C(mF) vs. l/d (mm).

FIG. 8 illustrates the impact of thickness in accordance with one embodiment, illustrating capacitance C versus inverse thickness 1/d. Ideally, as illustrated in Equation 2, there is an inverse relationship between capacitance and thickness. As shown, a linear fit 801 of the data is reasonably consistent with this theory.

Example 2

In another embodiment of the present invention another SDM is formed in the following manner Reference is still made to FIGS. 1, 4 and 5 regarding the general structure and method for forming dielectric layer 503 and SDM capacitor 500. Likewise the characteristics and general principals expressed by these features also apply to the example provided below.

In this second embodiment, the materials employed to create SDM dielectric layer 2 were an alumina/NaCl solution SDM. The SDM was created using high surface area aluminum oxide powder (Alfa Aesar, γ-phase, 99.97%, 3 micron APS Powder, S.A. 80-120 m2/g, CAS 1344-28-1), NaCl powder (Sigma-Aldrich 10 mesh anhydrous beads, 99.999%), and distilled deionized water, i.e., constituents. The above constituents were mixed by hand in three ratios. In all cases the alumina:$H_2O$ ratio was the same, 1 g alumina: 1.1 mL $H_2O$. Three different NaCl ratios were employed to create three different SDM: low salt SDM: 0.01 gm salt/1 gm alumina; medium salt SDM: 0.1 gm salt/1 gm alumina, and high salt SDM: 0.3 gm salt/1 gm alumina. Herein the phrase low salt refers to an amount of salt within the range of 0.01 to 0.08 gm salt/1 gm alumina; the phrase medium salt refers to an amount of salt within the range of 0.081 to 0.2/1 gm alumina; and the phrase high salt refers to an amount of salt within the range of 0.21 to 1 gm salt/1 gm alumina. In each case the mixing process was as follows. First, water was added to a plastic cup, next salt was added. These mixes were agitated by shaking, not stirring, until all the salt was dissolved in the water. Finally, alumina, in ratio set out above, was gradually added. This created a spreadable paste with little to substantially no 'free' water (incipient wetness). Salt and water are pH neutral.

Similar to Example 1 discussed above, pore structure is a component of the embodiment, the surface area and pore structure were determined from BET nitrogen isotherms collected at 77K and analyzed using a Quantachrome NOVA 4200e. Two samples were independently measured and both yielded results within 5% for all parameters; specifically a surface area of 39+/−1 m2/g, a total pore volume of 0.45 cm3/g and an average pore radius of 245+/−3 Å.

Dielectric layer 503 was formed as a paste that was spread evenly on a first electrode 501, which was a 5 cm diameter disc of GTA grade Grafoil (0.76 mm thick, >99.99% carbon). In the final step a second electrode 502 made of Grafoil was placed on top, then mechanically pressed to create a near constant thickness as determined by measurements made at multiple positions using a hand held micrometer. This step completed the construction of SDM capacitor 500. The thickness t of dielectric layer 503, required to compute the dielectric constant, used in all computations herein was based on subtracting the thickness of first electrode 501 and second electrode 502 from the measured total thickness of SDM capacitor 500. The measured thickness of each dielectric layer 503 used in the study of salt content effect are as follows: low salt 0.64+/−0.08 mm, medium salt 0.50+/−0.06 mm, high salt 0.46+/−0.02 mm. The errors are the spread in the eight thickness values measured. These errors probably accurately reflect real, but small, variations in the thickness of dielectric layer 2. These thickness errors dominate the error range computation reflected in the Tables III and IV below.

Once constructed one or more SDM capacitors 500 were placed in an electrically insulating plastic jig similar to 407 with bottom and top cylindrical aluminum electrodes of 5 cm diameter and 5 mm thickness. A 250 g weight was placed on top in all cases. SDM capacitors 500 were then placed in simple circuits, as shown in FIG. 3, for measurements of charge and discharge over nearly the full range of voltage possible. In each case in this study charging and discharging was performed through a 7.5 kOhm resistor for the low and medium salt capacitors, and performed through a 20 kOhm resistor for the high salt capacitor and varying thickness. Some of those at medium salt were also performed through a 20 kOhm resistor and varying thickness. A simple circuit, rather than a commercial meter, was used to measure capacitance and subsequently dielectric constant—the ability of the capacitor to store electrical energy. Commercial meters intended to measure capacitance employ an algorithm and are only suited for the study of higher frequency behavior. In order to evaluate the capacity for electrical energy storage, maximum operating voltage, and ~0 Hz data is needed. These values are not available from meters.

The primary test platform was a National Instruments ELVIS II electronics prototyping board implemented with LabView 2011 software. An additional multimeter, Agilent U1252A, was regularly used for independent parameter verification. It is further notable that the capacitance of several types of commercial capacitors were measured using the above described instruments and protocol, and in each case the measured value and the listed value were within 30%.

Discharge data was analyzed to determine capacitance using the classic voltage decay equation for a capacitor discharging through a constant load (R): $\ln(V/V_0) = -t/RC$, equation (1). Hence the slope of a curve of the left side of Eq(1) vs. t is 1/RC. As R is known and fixed, C is readily obtained. The value of C and needed dimensional measurements were used to determine dielectric constant.

The charging and discharging behavior of five SDM capacitors 500 created with sodium chloride salt based SDM was studied. The primary target of this study was to show that the effect of ion identity is not critical in creating super dielectric materials. Another objective was to study the impact of ion concentration on capacitive behavior.

Thus, the salt (NaCl) concentration was varied by a factor of 30 over three SDM capacitors such as 500 that were constructed using an SDM with a salt in different concentrations, while holding all other parameters virtually constant. However; small differences in some parameters, particularly the thickness of dielectric layer 2 (less than a factor of 1.5), was an inevitable consequence of the imprecise nature of the hand construction. Also, the impact of the thickness of dielectric layer, over a factor of six, in which all other parameters were held constant, confirmed that the dielectric constant of super dielectric materials is nearly independent of layer thickness. It must also be noted that this study directly relates to energy storage. If frequency with time constant is correlated, this data is below $10^{-3}$ Hz, as in each case the RC time constants were more than 1000 seconds.

Figure 9:
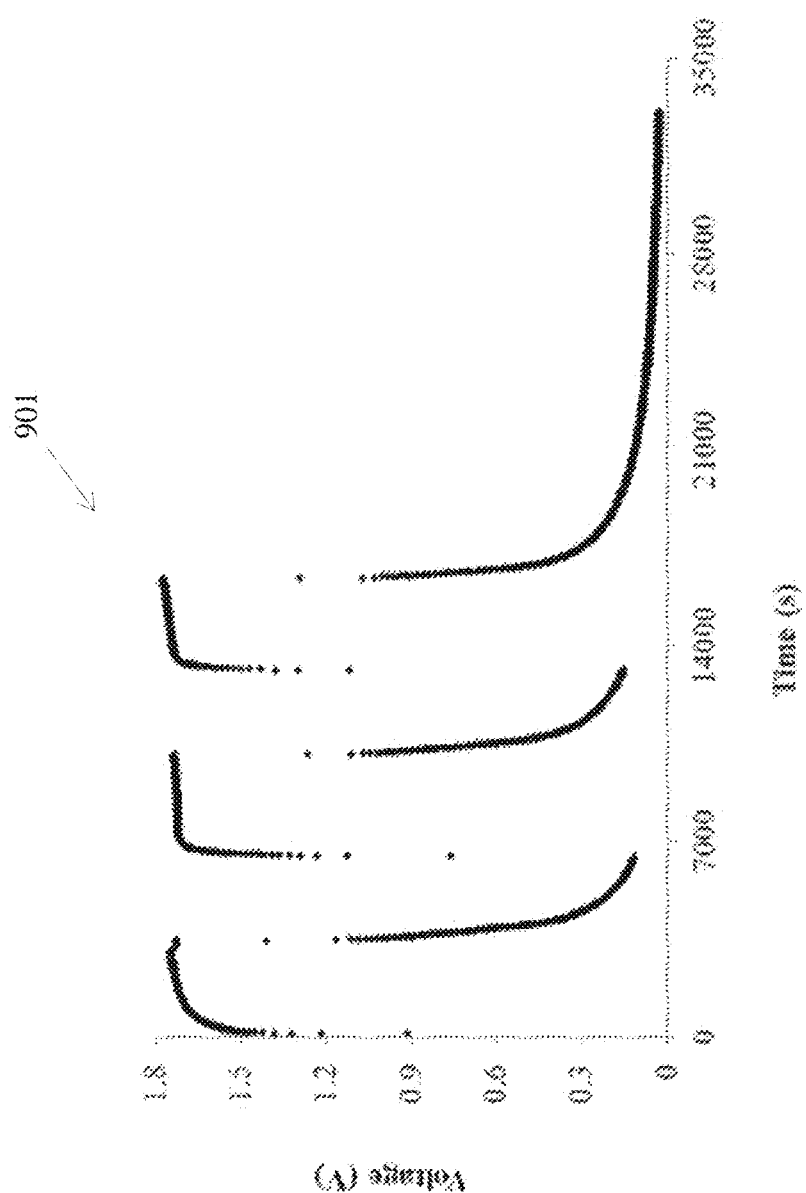
FIG. 9 is graph showing cycles of charge and discharge for SDM capacitors formed using salt based SDM.

Repeated charge/discharge cycles for SDM capacitors 500 formed using a low salt are shown in FIG. 9 and generally indicated at 901. Although the applied charging voltage was 4V, an SDM capacitor 500 constructed with a low salt based SDM never reached more than about 1.8 volts. From FIG. 8 it is readily apparent that this SDM capacitor 500, which is exemplary of all three studied, discharged in stages; initially very rapidly, down to approximately 1.1 Volt, then much more slowly. As discussed in detail below, the slow discharge region, which is below ~1 Volt, also can be divided into two different discharge regimes.

Figure 10:
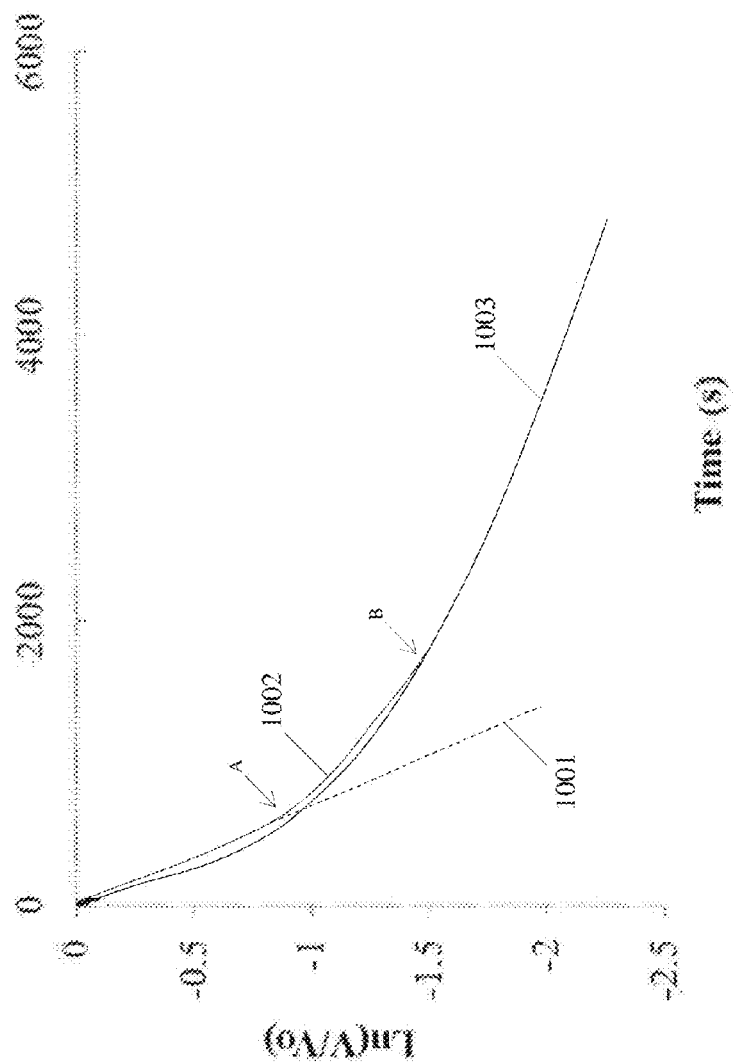
FIG. 10 is a graph showing the discharge cycles of the SDM capacitors shown in FIG. 9.

To explore the discharge behavior in a quantitative fashion, the discharge voltage/time data from the three cycles shown in FIG. 9 were plotted below 1.1 volts in a semi-log form FIG. 10, where 1001 represents the first cycle of FIG. 9 (t<7000), 1002 represents the second cycle of FIG. 9 (7000<t<14000), and 1003 represents the third cycle of FIG. 9 (14000<t). At FIG. 10, 1001 substantially merges with 1002 in the area generally indicated by A, and 1002 substantially merges with 1003 in the area generally indicated by B. For a constant capacitance these plots are linear, and show two linear regions of different slope with an 'elbow' between. In sum, the data can best be modeled as showing three regions of capacitance. The first region is between the highest voltages reached during charging, ~1.8 V, and about 1.1 volts. In this region the capacitance is low, and no effort was made to determine the actual value. The data is not plotted in FIG. 9. The second region is for voltages between ~1.1 Volts and ~350 mV. In this region the capacitance is very high and consistent for all three cycles. The third region is voltages below ~300 mV. In this region the capacitance is 'off scale', relative to commercial ceramic capacitors of the same size. Actual capacitance values are given in Tables 3 and 4.

Figure 18:
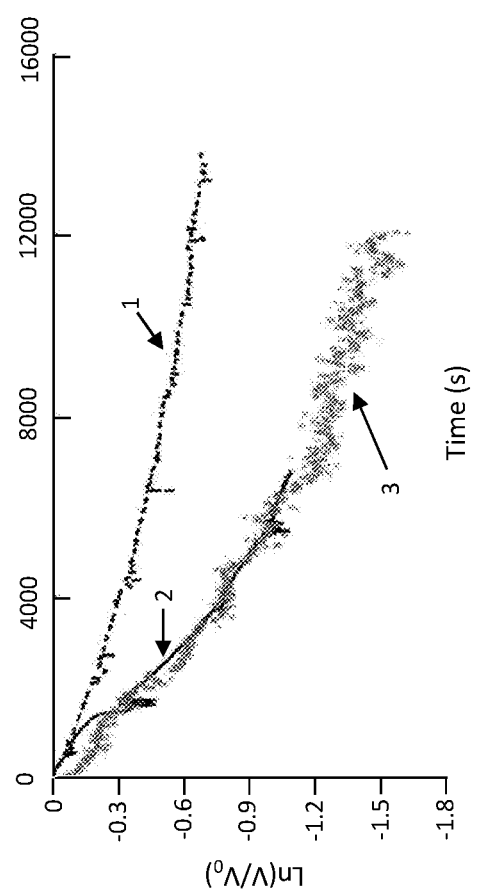
FIG. 18 is a graph showing the discharge of an SDM capacitor using medium salt SDM.

The discharge behavior of SDM capacitors 500 constructed with the medium salt SDM and low salt SDM were qualitatively similar. SDM capacitors 500 created with either low salt SDM or medium salt SDM discharged rapidly above a particular voltage, and both showed an 'elbow' in the discharge curve at a low voltage that corresponded to a change in capacitance. However; the quantitative values associated with these features were different. For a SDM capacitor 500 of medium salt the high capacitance/slow discharge point in the medium salt was lower, about 0.9 volts, rather than 1.1 volts. Also, the dielectric constants for dielectric layer 503 of SDM capacitor 500 of medium salt were consistently higher. During the high voltage leg the dielectric constant of the low salt SDM was fairly consistent over discharge curves, equal to $3.5+/-0.4\times10^9$, whereas the dielectric constant of the medium salt SDM was not less than $2.7\times10^{10}$, nearly 8 times higher than the low salt SDM. The dielectric constant of the low voltage leg of the medium salt SDM was at least 4 times higher than that observed of the low salt SDM. FIG. 18 illustrates the discharge behavior of a medium salt capacitor Discharge where in the region generally indicated at 1 and at Low Voltage (<'0.3V) the material has a very high dielectric constant, in the region generally indicated at 2 and at High Voltage (0.3<V<0.9) the dielectric constant is about 50% lower, and in the region generally indicated at 3, after drying this capacitor had approximately zero capacitance but the original high voltage capacitance was mostly restored, as shown, by the addition of water, as will be discussed.

To test the liquid dipole features, a SDM capacitor 500 constructed with the medium salt SDM was allowed to dry, its capacitance measured, and then the paste was re-wetted and its capacitance measured again. An SDM capacitor should have virtually no capacitance after drying, but capacitance should be restored with the addition of water. All observations were consistent with these expectations.

To test the dry state, SDM capacitor 500 constructed with a medium salt SDM was allowed to sit in the room for 15 days in order to dry out. At the end of this period of time the paste appeared dry and cracked. In this state SDM capacitor 500 constructed of medium salt SDM had a measured resistance of ~5 MOhms, and no measurable capacitance. That is, after charging for more than an hour, the capacitor discharged to ~1 mV in less than 10 seconds. The measured near zero capacitance is consistent with the absence of water.

A SDM capacitor 500 with a dielectric composed of dried and dead salt based SDM can be restored to initial performance by the addition of water. Indeed, as the salt content is not modified by the drying process, the addition of water to the pores should re-dissolve the salt and permit giant dipoles to form. With the addition of water SDM behavior should be restored. Water was added to the dried dielectric of the medium salt SDM capacitor 500 constructed with medium salt SDM by evenly spreading water, roughly equal to the amount initially present in the dielectric based on an initial measure of the weight of the paste employed in creating dielectric layer 503, on one side of first electrode 501 which was removed to permit the inspection. This first electrode 501, water side down, was then pressed back onto dielectric layer 503, reforming SDM capacitor 500. The result of this restoration protocol can be seen in FIG. 18 as it nearly restores the initial dielectric constant. There is one difference between the initial behavior of SDM capacitor 500 of medium salt, and that of restored SDM capacitor 500 of medium salt, below about 250 mV there is an elbow, but the data becomes very noisy. Hence, no low voltage capacitance value is provided.

Figure 11:
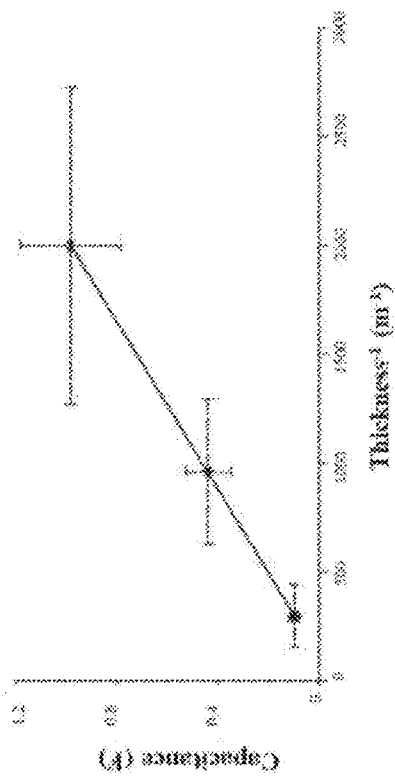
FIG. 11 is a graph of thickness vs. capacitance.

Another study performed with SDM capacitors 500 that used medium salt SDM was of the impact of thickness of dielectric layer, as shown in FIG. 11. The behavior matches a linear relationship between inverse thickness and capacitance.

SDM capacitors 500 constructed using medium salt SDM were evaluated for actual energy density. The thinnest dielectric studied was 0.5 mm thick and had a dielectric constant greater than $3*10^{10}$ below 0.9 V leading to a net energy density >0.4 J/cm3. With an SDM capacitor such as 500 constructed using high salt SDM, the qualitative discharge characteristics was similar to the SDM capacitors constructed with low and medium salt SDMs. First it can be, and was, repeatedly cycled, as per FIG. 9. Second, there was a region of low capacitance from about 1.8 V to 1.0 volts. Third, the slow discharge region could be divided into two sections, a section of high capacitance between about 1 V and 300 mV and a section of extremely high capacitance below 300 mV. The quantitative behavior was unique. At 'high voltages', roughly from 1 V to 300 mV, this capacitor showed performance similar to that observed for the SDM capacitor constructed with low salt SDM.

Figure 12:
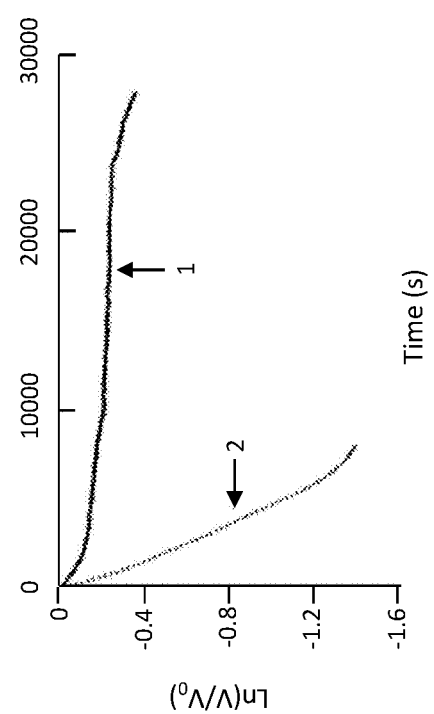
FIG. 12 is a graph of a second discharge cycle of an SDM capacitor using high salt.

Over the voltage range of 1 V to 300 mV, the dielectric constant was no more than 2 times that observed for the SDM capacitor 500 using low salt SDM and clearly far less than that observed for the medium salt sample. In sum, the measured dielectric constant over this voltage region is not a linear function of salt concentration. Below 300 mV there is a very sharp change in the dielectric value as shown in FIG. 11. In FIG. 12, in line 1, the capacitance is extremely high (>1×10") below 300 mV. In line 2, the capacitance between 1.0 V and 300 mV (>6×10$^9$) is similar to that observed for low salt SDM capacitors 10, 300 mV. In this voltage range the measured dielectric is similar to that observed for the medium salt SDM capacitors, in fact on average 15% higher. For this low voltage range there apparently is a positive correlation between dielectric constant and salt loading, one that may reach a limit asymptotically with the concentration of salt.

The various embodiments in accordance with the invention discussed above illustrate the formation of SDMs, i.e. dielectric materials with dielectric constants greater than $10^5$. In Example 1, the specific dielectric employed was a high surface area alumina impregnated, to the consistency of paste, with an aqueous solution of weak boric acid, which consistently showed dielectric constants greater than $4\times10^8$. In Example 2, the specific dielectrics of low, medium and high salt SDMs consistently showed dielectric constants greater than $3\times10^9$. Thus, the data illustrates that by adding an ionic solution to highly porous insulating materials creates a high dielectric material. Moreover, assuming a thickness of 5 microns, a typical value for inexpensive commercial ceramic capacitors, and using the average of the dielectric constants measured, i.e. $8\times10^8$, yields a remarkable energy density of ~1000 J/cm$^3$, for SDM capacitor 500. Even a computation based on the lowest dielectric constant ($4.4\times10^8$) and the lowest 'capacitive voltage' (0.7 V) measured in the present work, leads to an energy density of ~40 J/cm$^3$, still a remarkable value.

The particular dielectric employed is only one of a large family of similar dielectrics materials. A high surface area, highly porous, insulating material, filled with any dissolved acid, or base will have similar dielectric properties. There are many parameters that can be optimized including the identity of the solid, the porosity of the solid, the electrolyte employed, the electrolyte/solid ratio, the salt/acid/base employed to create ions, acid strength/salt concentration.

With embodiments in accordance with the invention of SDM described herein, charge separation, leading to dipole formation, occurs in the nano-scale drops of ion containing liquid in the pores of the alumina. Specifically, in an applied electric field the positive ions will tend to cluster toward the anode of SDM capacitor 500, and negative ions toward the cathode of SDM capacitor 500. This creates a greater charge separation, physically longer, and probably larger, than possible in a solid crystal. Indeed, charge motion in a solid crystal is physically limited to a very small distance, in fact less than the diameter of an atom. In a water drop charge separation can occur over the entire length of a pore. In the case of the alumina employed herein BET analysis indicated the average pore radius was about 250 Å. This indicates that the average dipoles are of length order 500 Å. Pore radius will vary depending on the material used, however generally the radius of the pore is between 100-10,000 Å, although it is postulated that the longer the pores the higher the dielectric constant. As electric dipole moment is proportional to the charge separation distance, and potential energy is proportional to the magnitude of the dipole, energy is proportional to charge separation. Moreover, dipole moment is proportional to the amount of charge separated. The combination of three orders of magnitude increase in dipole length and a significant increase in the magnitude of the charge separation may explain the 4 or 5 orders of magnitude increase in dielectric constant observed relative to that found for barium titinate. Finally, it is notable that pure water in the pores does not display super dielectric properties, as water only has a dielectric constant of approximately 80. Presently, no liquid has a dielectric constant greater than 300.

It is possible that each drop acts as a nearly perfect conductor, such that charges move until the field inside the drop is cancelled. This would make the drops 'metal like', with nearly infinite permittivity. The combination of very large physical dipoles, of nearly infinite permittivity, would create the super dielectric constant values observed in the present work. This can possibly be determined by measurement of capacitance as a function of temperature. At a voltage of around one volt, there is a 'dielectric breakdown' of water. As the water will not only exist in the pores, but will form a matrix that fills all empty space within the powder, once this breakdown occurs, there will be a conduction path from cathode to anode. Hence, as observed, at voltages above the breakdown voltage the effective dielectric constant will drop quickly to zero. Even absent an overall discharge path between electrodes, each individual drop would no longer be able to support a charge separation above the breakdown voltage. Second, in the absence of water there are no liquid drops available to form dipoles. This is consistent with the virtual disappearance of any capacitance once the solid fully dries. Third, once water is added to a desiccated dielectric the drops can reform, the chargeable species will still be present (probably on pore walls), and will re-dissolve, hence, the original dielectric behavior will be observed. This is also consistent with observation.

One difficulty is that water cannot enter pores below a certain size due to surface tension. Technically, this is correct, however; it is well known that water in the form of water vapor will enter pores of any size. In the event one or more 'primary adsorption sites' (PAH) exist in the pore, the water molecule will adsorb and nucleate the formation of a drop of water from other vapor phase water molecules. This leads to Type III isotherm behavior and the complete filling of the pore at a vapor pressure equal about 50% relative humidity. As the wetted alumina should have a local relative humidity of nearly 100%, and there is a high density of primary adsorption sites on a hydrophilic alumina surface, all pores, any size, should be filled. This may be tested through the use of alumina treated to create a hydrophobic surface. Such material should not exhibit SDM behavior.

Finally, the potential value of SDM capacitors 500 may be great for electric energy storage. As noted earlier, with reasonable extrapolation of the collected data, and the projected use of a dielectric with a higher discharge voltage, leads to a remarkable energy density of ~1000 J/cm$^3$. A D-battery ('flashlight battery') has a volume of ~53 cm$^3$. Assuming that about half that volume is taken up by SDM of 5 micron thickness, the rest of the volume evenly divided between electrode and insulating layers, means a 1 D-cell sized SDM capacitor 10 could hold 25,000 J. The best 'd-cell' super capacitors (costly) advertise a capacitance of 3000 V and a voltage of 2.7 V, for a total energy of approximately 11,000 J. In contrast, a typical D battery can deliver just over 80,000 J. This in turn suggests that with optimization, SDM capacitors 10, made of remarkably inexpensive SDM, could surpass supercapacitors, and rival batteries in terms of volumetric energy density.

Example 3

In another embodiment of the present invention, a capacitor was fabricated using nylon fabrics saturated with aqueous NaCl solutions, termed Fabric Superdielectric Materials (F-SDM). Alternative fabrics include any kind of absorbent paper, absorbent sponge material, cotton cloth, silk, etc.

All capacitors, so-called Novel Paradigm Supercapacitors (NPS), were created from three components: nylon fabric, aqueous solutions of NaCl (30 wt %), and Grafoil electrodes (0.4 mm thick×5 cm diameter), a commercially available, paper-like, moderate surface area (~20 m$^2$/gm) material composed of compressed graphite (>99%) flake electrodes (~0.4 mm thick). Nylon fabric (FIG. 1) squares, ~5.1 cm on a side, nominal thickness 0.36 mm, were dipped into the salt solution for approximately one hour, and then smoothed onto a Grafoil electrode. For the multi-layer samples, additional salt solution saturated fabric layers were added one at a time. The second Grafoil electrode was then placed on top and the thickness of the capacitor determined from an average of four measurements with a micrometer. Once the capacitor 'sandwich' was created, in order to retard drying, it was placed on a small plastic block, and the block placed in a plastic bag containing water saturated cloth.

The capacitive behavior was determined using a BioLogic Model SP 300 Galvanostat (Bio-Logic Science Instruments SAS, Claix, France) in constant current charge/discharge mode. At each selected constant current at least 10 complete cycles were recorded, and generally more than 20. This method does not permit the selection of the discharge rate; however, the discharge rate is a function of the discharge current. Thus, the trend in dielectric constants and energy density was determined by variation of the controllable parameter, discharge current. In all cases the charging current was the same magnitude as the discharge current, but of opposite sign.

Figure 13:
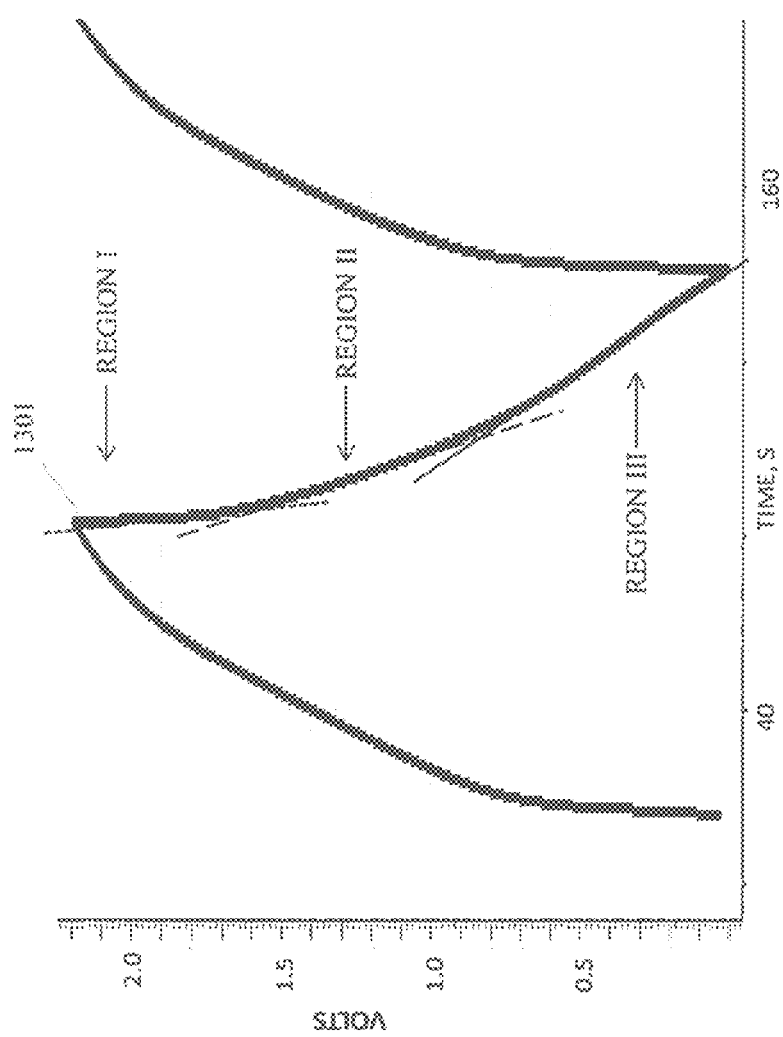
FIG. 13 illustrates a discharge cycle of an F-SDM capacitor.
Figure 14:
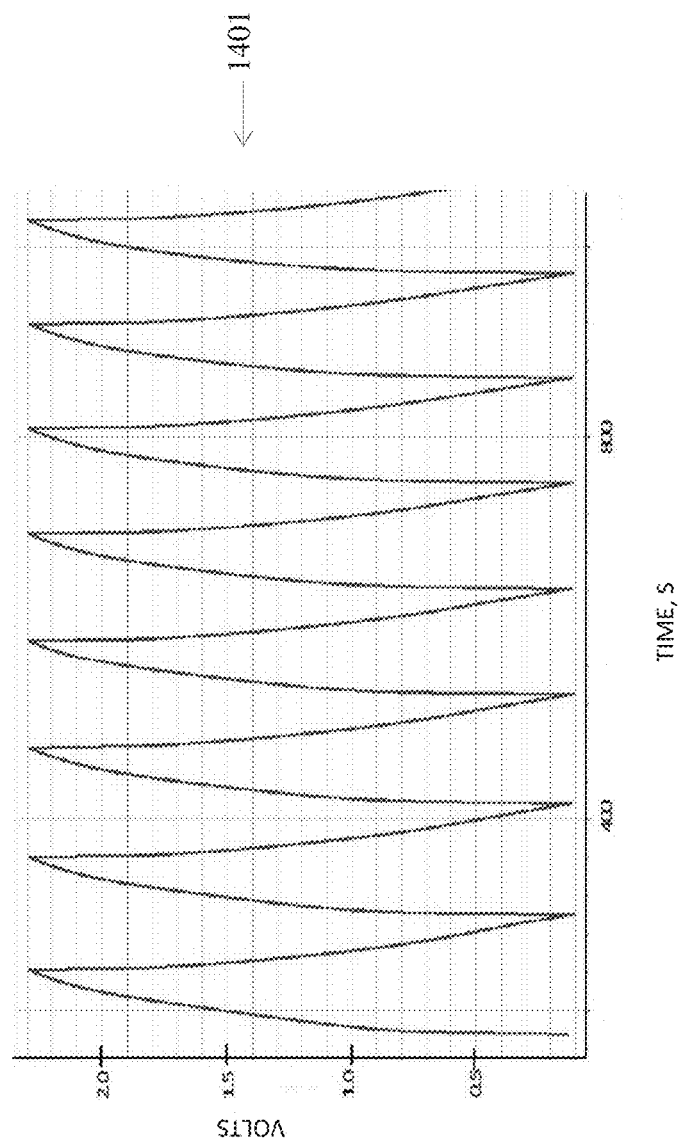
FIG. 14 illustrates discharge cycles of an F-SDM capacitor.
Figure 15:
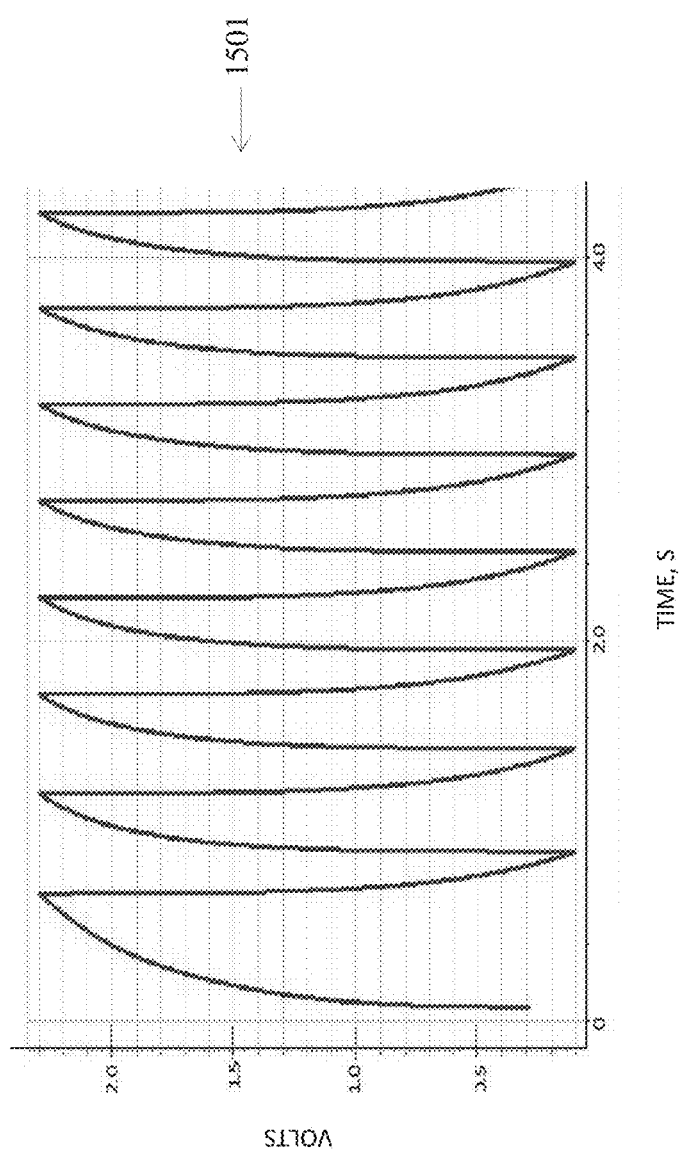
FIG. 15 illustrates additional discharge cycles of an F-SDM capacitor.

The voltage range in most cases was selected to be between 2.3 and 0.1 volts. An independent variable in the analysis is "time to discharge" (DT) for the discharge leg. DT is defined as the time for the voltage to go from 2.3-0.1 V. FIG. 13 shows one cycle (12 mA, DT ~54 s) as 1301 and generally indicates three voltage regions of 2.3-1.6 V for REGION I, 1.6-0.8 volts for REGION II and <0.8 volts for REGION III. FIG. 14 illustrates a series of cycles generally as 1401 (12 mA, DT ~54 sec, 7 cycles). FIG. 15 illustrates a series of cycles generally as 1501 (90 mA, DT ~0.25 s, 7 cycles). Typically, as shown, the first ~3 cycles collected at any current value are 'not typical' and not used in computation. Frequency was not employed as a time unit for several reasons: i) the discharge curves are not sine waves or of regular pattern; ii) cycle time implies symmetric charge/discharge legs, and although the DT and TC ("Time to Charge") was always within 30%, a perfectly symmetric charge/discharge was not observed; and iii) the "discharge time" is a conservative, quantitative parameter related to "Power" output, the presumed application of Novel Paradigm Supercapacitors. DT values are roughly related to frequency through the standard parameter of "period", T where frequency is 1/T. The discharge time is not directly controlled but rather is a function of the constant current applied. The higher the current applied, the faster charge/discharge. Hence, a range of currents was selected to determine dielectric values, energy density, etc. as a function of DT (Table 5).

The capacitance, dielectric value, energy density and power delivery characteristics of five capacitors were studied as a function of DT. These capacitors were designed to be nearly identical in all respects except for the thickness of the dielectric layer (Table I). Typical observed behavior for the 'constant current' tests is shown in FIG. 2 for several DT. A material with a voltage independent dielectric constant will produce a straight line, and it was consistently found that for the F-STM studied herein, that is only the case for DT>50 seconds. As with previous studies of SDM materials, the dielectric constant is found to vary with voltage for DT less than about 50 seconds. Indeed, there are roughly three regions of near constant dielectric constant: 2.3-1.6 V (Region I), 1.6-0.8 volts (Region II) and <0.8 volts (Region III). For the present study the focus is on the dielectric constant of Region III.

Figure 16:
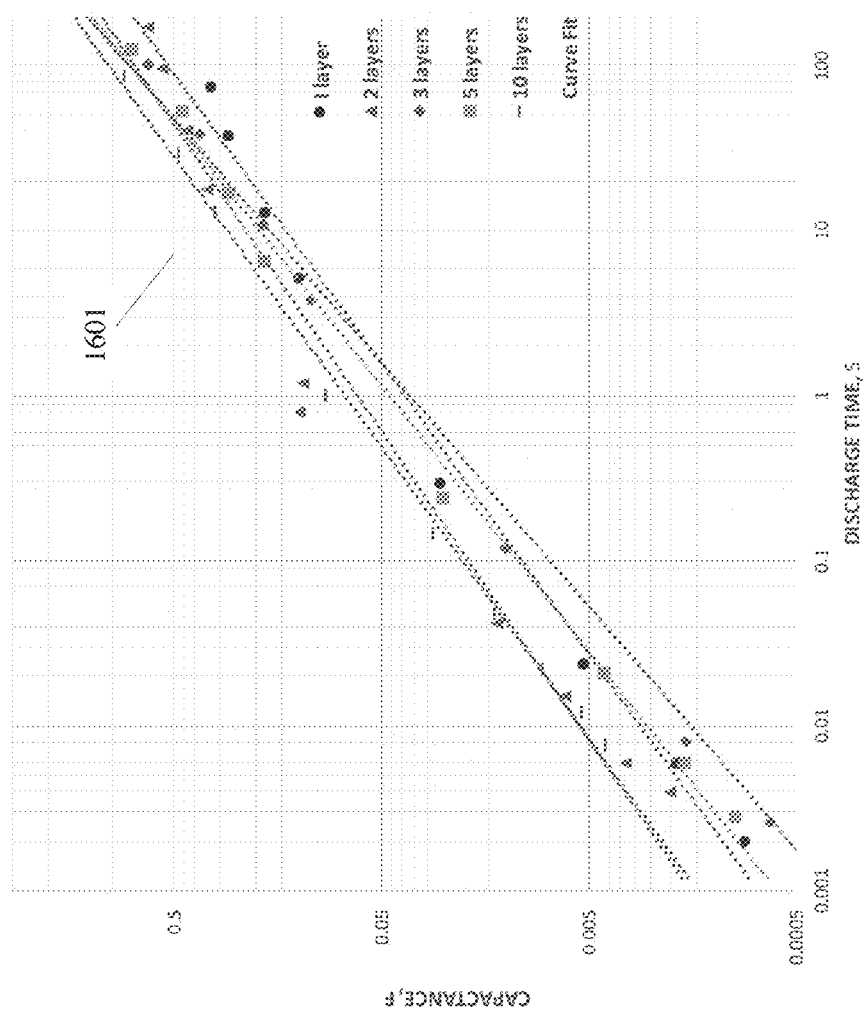
FIG. 16 illustrates capacitance for embodiments of the F-SDM capacitor.

Capacitance for the voltage Region III is shown in FIG. 16 for all five capacitors tested. In all cases the capacitance 'rolls off' very smoothly as a power law with decreasing discharge time. Except for the 3-layer case the same power law describes the roll off of all the test capacitors very well: Capacitance=$C_{100}*(100/DT)^{-0.55}$; where $C_{100}$ is the capacitance at 100 seconds, and DT is the discharge time. Roughly, this is equivalent to a roll off of 0.55 dB capacitance for 1.0 dB decrease in 'period'. The 'fit line' of the equation is indicated as 1601 in FIG. 16. The same relationship also fits the dielectric data, substituting dielectric value for capacitance and '$D_{100}$' for $C_{100}$. Also nearly the same relationship fits virtually all the energy data ('$E_{100}$' for $C_{100}$), except the exponent is changed to ~0.60 from ~0.55, indicating a slightly faster energy roll off.

Figure 17:
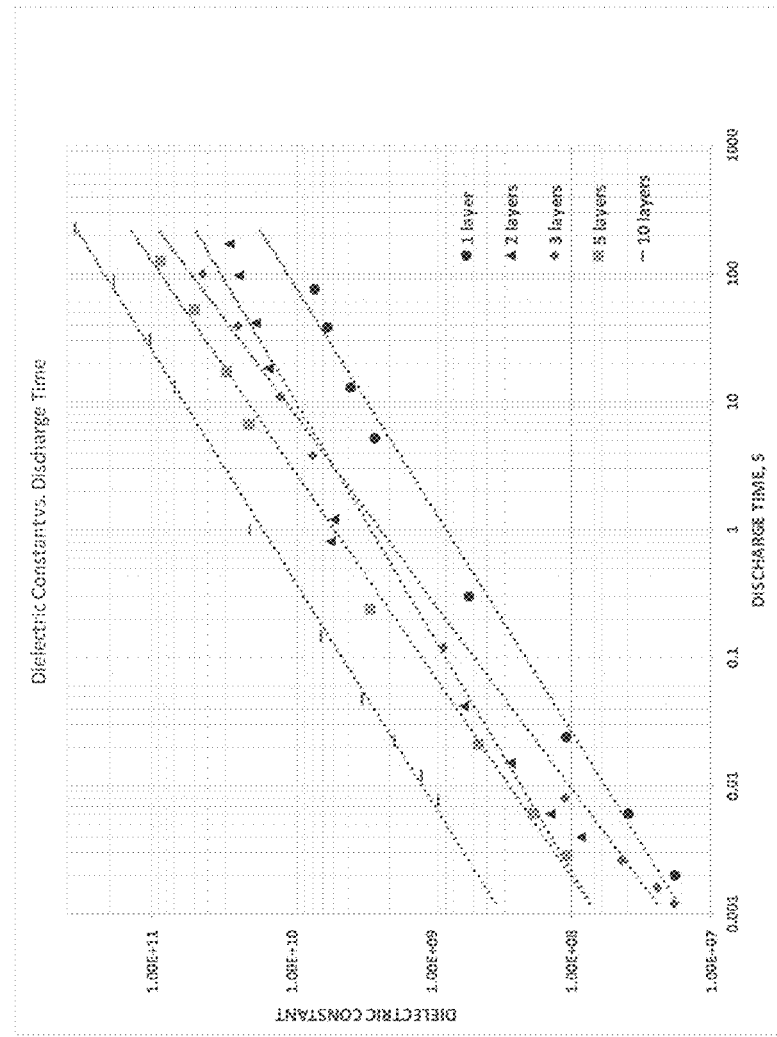
FIG. 17 illustrates dielectric constants for embodiments of the F-SDM capacitor.

The variation of the dielectric constant in Region III is an important parameter, but does not tell the entire story. FIG. 17 illustrates dielectric constant versus discharge time for the five capacitors tested. The dielectric constant decreases with increasing voltage, and the ratio of the dielectric constants in the regions is a function of DT. For a DT of approximately 1 second the dielectric constant for the Region III is twice that for Region II and 4× that for Region I. For a DT of 0.01 s the dielectric constant for Region III is 3 that for Region II and 10 that of Region I. In all cases, even for discharge times of order 0.001 s, the measured dielectric constant was >$10^7$. At relatively long discharge times, >100 seconds, the dielectric constants were, remarkably, >$10^{10}$ in all cases.

One significant outcome from this work, evident from FIG. 17 and Table 5, are the remarkable dielectric constants values for Region III at long DT (>50 seconds) with the highest directly observed value 3.5 $10^{11}$ (350 billion) for a discharge time of the 10 layer F-SDM of >200 seconds. Clearly, F-SDM are superdielectrics.

As described herein a class of materials with dielectric constants greater than $10^5$, herein called super dielectric materials (SDM), can be generated readily from common, inexpensive materials, such as high surface area aluminum oxide powder and boric acid, NaCl powder and distilled deionized water. This is a remarkable increase over the best dielectrics constants previously measured, ca. 1×$10^4$. A porous, electrically insulating material (e.g. high surface area powders of silica, titantia), filled with a liquid containing a high concentration of ionic species can potentially be an SDM. It is postulated that water containing relative high concentrations of dissolved ions saturates all, or virtually all, the pores of the alumina, having an average diameter 500 Å. In an applied field the positive ionic species migrate to the anode end, and the negative ions to the cathode end of each drop. This creates giant dipoles with high charge, hence leading to SDM behavior. At about 1 volt, water begins to break down, creating enough ionic species to 'short' the individual water droplets. Potentially capacitors made of stacks of SDM capacitors 10 can surpass super capacitors in volumetric energy density.

Additionally described herein is method for supplying power to a load using the capacitor as described. The method comprises applying a first voltage to the first electrode and a second voltage to the second electrode, where a difference between the second voltage and the first voltage is less than a breakdown voltage of the liquid comprising ions within the pores of the porous material of the dielectric material and generating a charged capacitor. Subsequently, the charged capacitor is electrically connected to the load and the charged capacitor discharges to the load, thereby supplying power to the load. For example, relative to FIG. 3, the first electrode and second electrode might comprise capacitor C and the first voltage and second voltage might be a voltage across the voltage source $E_{DC}$ when the illustrated switch is in the up position as discussed, such that capacitor C charges based on the voltage across voltage source $E_{DC}$ to generate the charged capacitor. Subsequently, the switch is placed in the down position to discharge capacitor C through the load R to supply power to the load R. Here and elsewhere and as is understood, "breakdown voltage" means the minimum voltage or potential difference between two ends of a substance required to cause an electric breakdown such that electron flow will occur. See e.g. Herbert, J. M., *Ceramic Dielectrics and Capacitors*, Vol. 6 (1992), among many others.

Additionally described herein is method of making a capacitor comprising the steps of mixing a porous material comprising pores with a liquid comprising ions into a paste and driving the liquid comprising ions into the pores comprising the porous material, where the liquid comprising ions has an ionic strength of at least 0.1, and where the porous material comprises an insulating material having a conductivity less than $10^{-8}$ S/cm, thereby forming the dielectric material; applying the dielectric material to a first electrode comprising a first conductive material having a conductivity greater than $10^3$ S/cm to establish contact between the dielectric material and the first electrode; and locating a second electrode comprising a second conductive material having a conductivity greater than $10^3$ S/cm on the dielectric material, where the second electrode is located such that the dielectric material separates the first electrode and the second electrode, thereby establishing contact between the dielectric material and the second electrode and thereby separating the first electrode and the second electrode with the dielectric material, thereby making the capacitor.

It is to be understood that even though numerous characteristics and advantages of the present invention have been set forth in the foregoing description, together with details of the method, composition and function of the invention, the disclosure is illustrative only, and changes may be made in detail, within the principles of the invention to the full extent indicated by the broad general meaning of the terms in which the appended claims are expressed.

Although the invention has been described using relative terms such as "down," "out," "top," "bottom," "over," "above," "under" and the like in the description and in the claims, such terms are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

TABLE 1

| Composition | Dielectric Thickness (d) | Initial Discharge Voltage ($V_0$) | Dielectric Constant ($\varepsilon_R$) | Operating Voltage |
|---|---|---|---|---|
| 3 g alumina 0.3 g boric acid 3 mL $H_2O$ | 1.47 mm | 2.20 V | 1.81E9 | 0.7 V |
| 4 g alumina 0.4 g boric acid 4 mL $H_2O$ | 2.46 mm | 2.16 V | 5.78E8 | 0.8 V |
| 5 g alumina 0.5 g boric acid 5 mL $H_2O$ | 2.87 mm | 1.85 V | 4.44E8 | 0.9 V |
| 8 g alumina 0.8 g boric acid 8 mL $H_2O$ | 4.13 mm | 2.18 V | 4.43E8 | 0.8 V |

TABLE 2

| Composition | Dielectric Thickness (d) | Initial Discharge Voltage ($V_0$) | Dielectric Constant ($\varepsilon_R$) | Operating Voltage |
|---|---|---|---|---|
| 3 g alumina 0.3 g bolic acid 3 mL $H_2O$ | 1.47 mm | 220 V | 1.81E9 | 0.7 V |
| 4 g alumina 0.4 g boric acid 4 mL $H_2O$ | 2.46 mm | 2.16 V | 5.78E8 | 0.8 V |
| 5 g alumina 0.5 g boric acid 5 mL $H_2O$ | 2.87 mm | 1.85 V | 4.44E8 | 0.9 V |
| 8 g alumina 0.8 g boric acid 8 mL $H_2O$ | 4.13 mm | 2.18 V | 4.43E8 | 0.8 V |

TABLE 3

| SALT LEVEL | CYCLE | VOLTAGE | CAPACITANCE (F) | DIELECTRIC CONSTANT | Max Error % Capacitance and Dielectric |
|---|---|---|---|---|---|
| Low | $1^{st}$ discharge, high volts | 1.1-0.3 | 0.086 | $3.1 \times 10^9$ | +/−20% |
| Low | $1^{st}$ discharge, low volts | <0.3 | 0.093 | $3.4 \times 10^9$ | +/−20% |
| Low | $2^{nd}$ discharge, high volts | 1.1-0.35 | 0.11 | $3.9 \times 10^9$ | +/−20% |
| Low | $2^{nd}$ discharge, low volts | <0.30 | 0.306 | $1.1 \times 10^{10}$ | +/−20% |
| Low | $3^{rd}$ discharge, high volts | 1-0.35 | 0.09 | $3.3 \times 10^9$ | +/−20% |
| Low | $3^{rd}$ discharge, low volts | <0.30 | 0.45 | $1.6 \times 10^{10}$ | +/−20% |
| Medium | $1^{st}$ discharge, High volts | 0.8-0.3 | 0.98 | $2.7 \times 10^{10}$ | +/−25% |
| Medium | $1^{st}$ discharge, Low volts | <0.3 | 2.25 | $6.3 \times 10^{10}$ | +/−25% |
| Medium | $2^{nd}$ discharge, High volts | 0.9-0.3 | 1.05 | $3.1 \times 10^{10}$ | +/−25% |
| Medium | $2^{nd}$ discharge, Low volts | <0.3 | 2.25 | $6.3 \times 10^{10}$ | +/−25% |

TABLE 4

| SALT LEVEL | CYCLE | VOLTAGE | CAPACITANCE (F) | DIELECTRIC CONSTANT | Max Error % Capacitance and Dielectric |
|---|---|---|---|---|---|
| Medium | After Dry and Rewet | 0.9-0.3 | 0.80 | $2.2 \times 10^{10}$ | +/−30% |
| High | 1$^{st}$ discharge, High volts | 1.0-0.3 | 0.17 | $4.4 \times 10^{9}$ | +/−20% |
| High | 1$^{st}$ discharge, Low volts | <0.3 | 1.49 | $3.9 \times 10^{10}$ | +/−20% |
| High | 2$^{nd}$ discharge, High volts | 1.0-0.3 | 0.24 | $6.2 \times 10^{9}$ | +/−20% |
| High | 2$^{nd}$ discharge, low volts | <0.3 | 4.7 | $1.2 \times 10^{11}$ | +/−20% |
| High | 3$^{rd}$ discharge, High volts | 1.1-0.3 | 0.19 | $4.9 \times 10^{9}$ | +/−30% |
| High | 3$^{rd}$ discharge, low volts | <0.3 | 2.49 | $5.5 \times 10^{10}$ | +/−30% |

TABLE 5

| Layers | Thickness (cm) | Approx. Dielectric Constant * DT** 50 seconds | Approx. Energy Density (J/cm$^3$) DT** 50 seconds |
|---|---|---|---|
| 1 | 0.036 | $5 * 10^9$ | 0.7 |
| 2 | 0.074 | $2 * 10^{10}$ | 0.6 |
| 3 | 0.114 | $3 * 10^{10}$ | 0.2 |
| 5 | 0.191 | $5 * 10^{10}$ | 0.15 |
| 10 | 0.38 | $1.2 * 10^{11}$ | 0.08 |

What is claimed is:

1. A capacitor comprising:
   a first electrode;
   a second electrode; and
   a dielectric material separating the first electrode and the second electrode, the dielectric comprising:
      a porous material comprising pores, where the porous material contacts the first electrode and the second electrode, and where the porous material has a surface area greater than 0.5 m$^2$ of surface/gm of material; and
      a liquid comprising ions within the pores of the porous material.

2. The capacitor of claim 1 where the liquid comprises a solvent and a solute and where the solute has a molarity of at least 0.1 moles solute per liter of solvent.

3. The capacitor of claim 2 where the solvent is a polar liquid.

4. The capacitor of claim 3 where the polar liquid has a dielectric constant of at least 5.

5. The capacitor of claim 4 where the solute is a salt, an acid, or a base.

6. The capacitor of claim 5 where the solute is selected from the group consisting of boric acid, potassium hydroxide, sodium chloride, or mixtures thereof.

7. The capacitor of claim 4 where the liquid has at least a 10% saturation of the solute in the solvent.

8. The capacitor of claim 1 where the liquid has an ionic strength of at least 0.1.

9. The capacitor of claim 8 where the ions comprise cations and anions and where the cations have an ionic concentration of at least 0.1 moles per liter of liquid and where the anions have an ionic concentration of at least 0.1 moles per liter of liquid.

10. The capacitor of claim 1 where the first electrode and the second electrode comprise a conductive material having a conductivity greater than $10^3$ S/cm, and where the porous material comprises an insulating material having a conductivity less than $10^{-8}$ S/cm.

11. The capacitor of claim 10 where the first electrode and the second electrode are separated by a thickness t from the first electrode to the second electrode, and where the pores comprising the porous material have a mean pore diameter of less than 10% of the thickness t.

12. The capacitor of claim 11 where the mean pore diameter is greater than or equal to 1 Å and less than or equal to 200,000 Å.

13. The capacitor of claim 11 where porous material comprises a plurality of particles where each particle in the plurality has a mean pore diameter is greater than or equal to 1 Å and less than or equal to 200,000 Å.

14. A method of supplying power to a load using the capacitor of claim 1 comprising
   applying a first voltage to the first electrode and a second voltage to the second electrode, where a difference between the second voltage and the first voltage is less than a breakdown voltage of the liquid comprising ions within the pores of the porous material of the dielectric material, thereby generating a charged capacitor; and
   electrically connecting the charged capacitor to the load and discharging the charged capacitor to the load, thereby supplying power to the load.

15. A method of making the capacitor of claim 1 comprising:
   mixing the porous material comprising pores with the liquid comprising ions into a paste and driving the liquid comprising ions into the pores comprising the porous material, where the liquid comprising ions has an ionic strength of at least 0.1, and where the porous material comprises an insulating material having a conductivity less than $10^{-8}$ S/cm, and where the porous material has a surface area greater than 0.5 m$^2$ of surface/gm of material, and where the paste comprises the porous material and the liquid containing ions, thereby forming the dielectric material;
   applying the dielectric material to the first electrode and establishing contact between the dielectric material and the first electrode, where the first electrode comprises a first conductive material having a conductivity greater than $10^3$ S/cm; and
   placing the second electrode on the dielectric material at a location such that the dielectric material separates the first electrode and the second electrode, where the second electrode comprises a second conductive material having a conductivity greater than $10^3$ S/cm, thereby establishing contact between the dielectric material and the second electrode and thereby separating the first electrode and the second electrode with the dielectric material, thereby making the capacitor.

16. A capacitor comprising:
   a first electrode comprising a first conductive material where the first conductive material has a conductivity greater than $10^3$ S/cm;
   a second electrode comprising a second conductive material where the second conductive material has a conductivity greater than $10^3$ S/cm; and
   a dielectric material separating the first electrode and the second electrode, the dielectric comprising:
      a porous material comprising pores, where the porous material comprises an insulating material having a conductivity less than $10^{-8}$ S/cm, and where the porous material has a surface area greater than 0.5 m² of surface/gm of material, and where the porous material contacts the first electrode and the second electrode; and a liquid comprising ions within the pores of the porous material where the liquid has an ionic strength of at least 0.1.

17. The capacitor of claim 16 where the first electrode and the second electrode are separated by a thickness t from the first electrode to the second electrode, and where the pores comprising the porous material have a mean pore diameter of less than 10% of the thickness t.

18. The capacitor of claim 17 where the ions comprise cations and anions and where the cations have an ionic concentration of at least 0.1 moles per liter of liquid and where the anions have an ionic concentration of at least 0.1 moles per liter of liquid.

19. The capacitor of claim 18 where the mean pore diameter is greater than or equal to 1 Å and less than or equal to 200,000 Å.

\* \* \* \* \*